(12) United States Patent
Buchmueller

(10) Patent No.: US 9,676,481 B1
(45) Date of Patent: Jun. 13, 2017

(54) TETHER COMPENSATED AIRBORNE DELIVERY

(71) Applicant: Amazon Technologies, Inc., Seattle, WA (US)

(72) Inventor: Daniel Buchmueller, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 82 days.

(21) Appl. No.: 14/671,343

(22) Filed: Mar. 27, 2015

(51) Int. Cl.
  *B64D 1/12* (2006.01)
  *B64C 39/02* (2006.01)
  *G05D 1/02* (2006.01)

(52) U.S. Cl.
  CPC .............. *B64D 1/12* (2013.01); *B64C 39/024* (2013.01); *G05D 1/0204* (2013.01); *B64C 2201/128* (2013.01); *B64C 2201/14* (2013.01)

(58) Field of Classification Search
  None
  See application file for complete search history.

(56) References Cited

U.S. PATENT DOCUMENTS

| | | | | |
|---|---|---|---|---|
| 3,223,358 A | * | 12/1965 | Quick | B64C 27/20 244/17.17 |
| 3,227,398 A | | 1/1966 | Struble, Jr. | |
| 3,510,107 A | | 5/1970 | Fidler | |
| 3,838,836 A | * | 10/1974 | Asseo | B64D 1/22 244/137.4 |
| 3,904,156 A | * | 9/1975 | Smith | B66C 13/06 212/273 |
| 5,190,250 A | * | 3/1993 | DeLong | B64D 1/22 244/118.1 |
| H2163 H | | 8/2006 | Mulhern | |
| 9,321,531 B1 | * | 4/2016 | Takayama | B64D 1/12 |
| 9,422,139 B1 | * | 8/2016 | Bialkowski | B66D 1/48 |
| 2007/0200032 A1 | * | 8/2007 | Eadie | B64D 1/22 244/137.4 |
| 2010/0038477 A1 | | 2/2010 | Kutzmann et al. | |

(Continued)

OTHER PUBLICATIONS

U.S. Appl. No. 14/558,046, filed Dec. 2, 2014, Non-Final Office Action mailed on Aug. 9, 2016.

(Continued)

*Primary Examiner* — Khoi Tran
*Assistant Examiner* — Ryan Rink
(74) *Attorney, Agent, or Firm* — Thomas | Horstemeyer LLP; Michael J. D'Aurelio; Jason M. Perilla

(57) ABSTRACT

A tether compensated unmanned aerial vehicle (UAV) is described. In one embodiment, the UAV includes a winch with a tether to lower an item from the UAV for delivery, a flight controller to control a flight path of the UAV, a tether compensation mechanism through which the tether extends, at least one sensor to identify movement in the tether, and a tether response controller. Based on movement identified in the tether, the tether response controller may determine a complementary response and direct the tether compensation mechanism to brace the tether against the movement. Thus, the tether compensation mechanism may stabilize sway or movement in the tether by moving against the sway or movement, which may help prevent the tether from undesirable swinging when lowering the item from the UAV for delivery, for example, or at other times.

20 Claims, 7 Drawing Sheets

(56) References Cited

U.S. PATENT DOCUMENTS

| | | | |
|---|---|---|---|
| 2011/0079678 A1* | 4/2011 | Brenner | B64C 27/001 244/17.13 |
| 2012/0030974 A1* | 2/2012 | Runggaldier | E01H 4/02 37/235 |
| 2012/0168397 A1* | 7/2012 | Lim | B66D 3/18 212/273 |
| 2013/0112643 A1* | 5/2013 | Lecours | B66C 13/18 212/276 |
| 2015/0158587 A1 | 6/2015 | Patrick et al. | |
| 2015/0331427 A1* | 11/2015 | Chaudary | B64C 39/024 244/17.13 |
| 2016/0083115 A1* | 3/2016 | Hess | B64F 3/02 701/3 |

OTHER PUBLICATIONS

U.S. Appl. No. 14/558,046, filed Dec. 2, 2014, Restriction/Election mailed on Jun. 3, 2016.
U.S. Appl. No. 14/558,046, filed Dec. 2, 2014, Final Office Action mailed on Feb. 9, 2017.

* cited by examiner

TETHER COMPENSATED AIRBORNE DELIVERY

BACKGROUND

The delivery of items typically includes picking and packaging the items, providing the packaged items to a carrier for delivery, and delivering the items. Even for small items or small numbers of items, boxes or other packages are typically transported by vehicles over roads, sometimes across long distances.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1A:
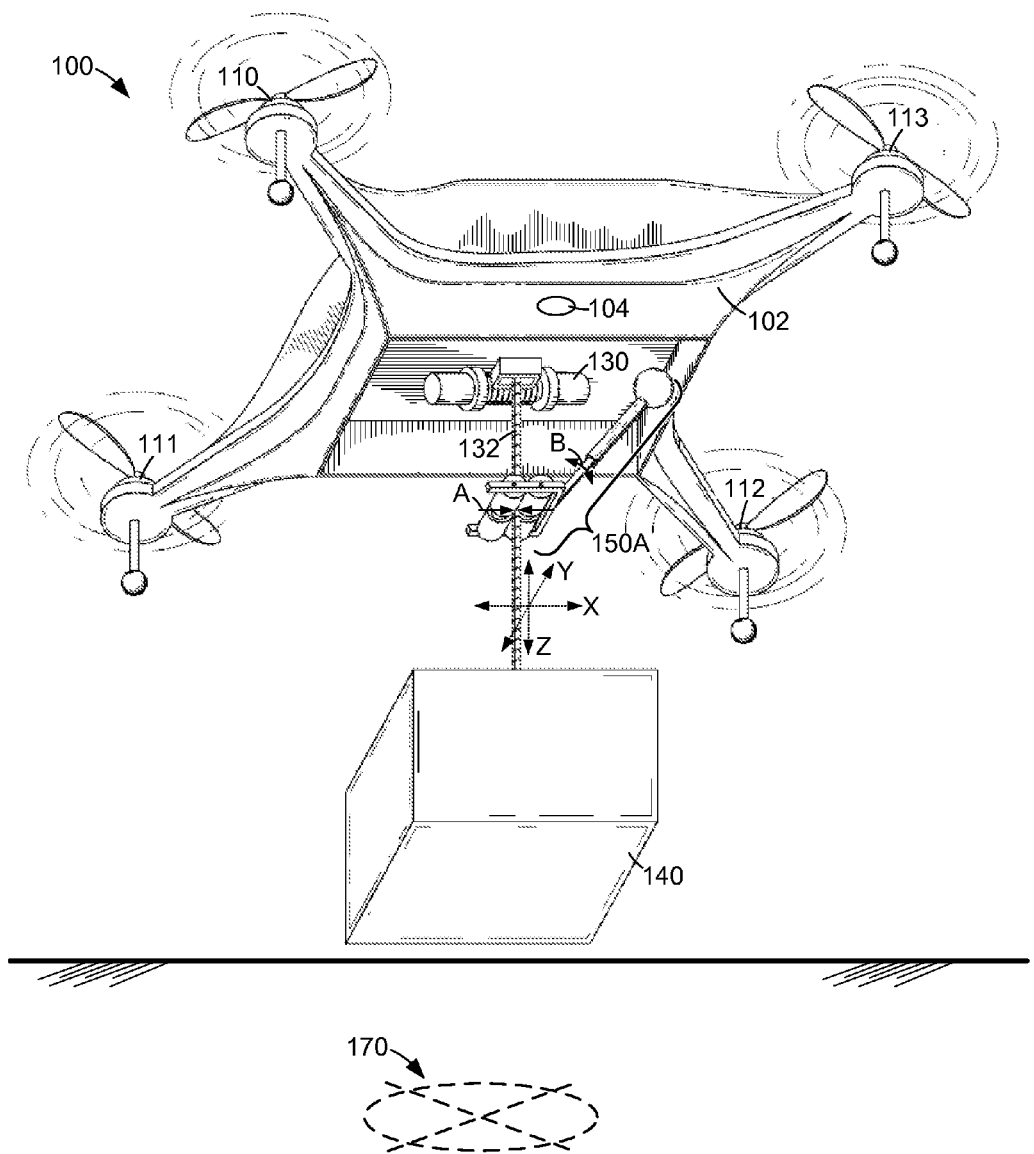
FIG. 1A illustrates a perspective view of an example tether compensated unmanned aerial vehicle (UAV) according to one embodiment of the present disclosure.

Embodiments of a tether compensated unmanned aerial vehicle (UAV) are described. In this regard, FIG. 1A illustrates a perspective view of an example tether compensated UAV 100 according to one embodiment of the present disclosure. The UAV 100 includes a frame body housing 102 having arms that support motors 110-113. Propellers are attached to the motors 110-113 to provide thrust for flight of the UAV 100. A camera 104 may be provided on an exterior of the frame body housing 102. The camera 104 may include one or more image sensors and be relied upon for monitoring the height of the UAV 100, navigating the UAV 100, and other purposes described herein. The UAV 100 also includes at least one winch 130. As illustrated, the winch 130 is wound with a tether 132 which may be extended down from the winch 130. When an item 140 is attached to the extendable end of the tether 132, the winch 130 may be relied upon to raise or lower the item 140 for transport and delivery.

In operation, the UAV 100 may be used to provide airborne delivery of items, packages, parcels, etc. That is, after the item 140 is secured to the tether 132 using a suitable attachment mechanism, the UAV 100 may travel by flight to a delivery zone 170. While travelling, the item 140 may be raised by the winch 130 and maintained in a retracted position. When the UAV 100 is positioned in flight above the delivery zone 170, the tether 132 and attached item 140 may be extended or lowered down from the UAV 100 by the winch 130 and the item 140 released at the delivery zone 170.

Rather than landing the UAV 100 at the delivery zone 170 before releasing the item 140, various advantages may be realized by using the winch 130 to lower the item 140 toward the landing surface at the delivery zone 170 before it is released. For example, it may be more energy efficient to maintain the UAV 100 at a minimum height above the landing surface when delivering the item 140, rather than landing the UAV 100. Further, it may be safer for the UAV 100 and/or individuals near the delivery zone 170 to maintain the UAV 100 at a minimum height above the landing surface when delivering the item 140.

The use of the winch 130 to lower the item 140 from the UAV 100 may give rise to certain operating considerations, such as the potential for flight instability for the UAV 100, the potential for undesirable movement, sway, or oscillations in the tether 132 and the item 140, the potential for unexpected swing in the tether 132, etc. At least some of these operating considerations may be attributed to movement experienced in the tether 132, at least some of which may be translated through the winch 130 to the UAV 100.

Movement in the tether, as described herein, may be caused by air resistance against the tether 132 and/or the item 140, wind, rain, hail, or other meteorological factors, changes in speed and/or direction of the UAV 100 which tend to shift the momentum of the tether 132 and/or the item 140, and other external forces or factors and combinations thereof. The movement may include one or a combination of lateral movement (e.g., "X" and "Y") and/or vertical tension (e.g., "Z") components of motion and/or force, as illustrated by the dotted lines in FIG. 1A.

In view of these and other considerations, the UAV 100 includes a tether compensation mechanism 150A. As described in further detail below, the tether compensation mechanism 150A may be relied upon to brace the tether 132 against vertical motion experienced in the tether 132. In that sense, the tether compensation mechanism 150A may grab, grip, pinch, or clamp the tether 132 to hold and prevent it from pulling further away from the winch 130 and the UAV 100. In that context, a representative grabbing or gripping motion by the tether compensation mechanism 150A is indicated at reference "A" in FIG. 1A.

The tether compensation mechanism 150A may also be relied upon to compensate for lateral motion experienced in the tether 132. In that sense, the tether compensation mechanism 150A may actuate or move to compensate for motion detected in the tether 132. In other words, the tether compensation mechanism 150A may stabilize sway or movement in the tether 132 by moving against the sway, which may prevent the tether 132 from undesirable swinging, for example. In that context, a representative compensating motion is indicated at reference "B" in FIG. 1A.

Thus, as further described below, the use of the tether compensation mechanism 150A in combination with the winch 130 may help to avoid flight instability for the UAV 100, the potential for undesirable sway or oscillations in the tether 132 and the item 140, and other conditions which may prevent the UAV 100 from safely delivering the item 140 to the delivery zone 170.

Figure 1B:
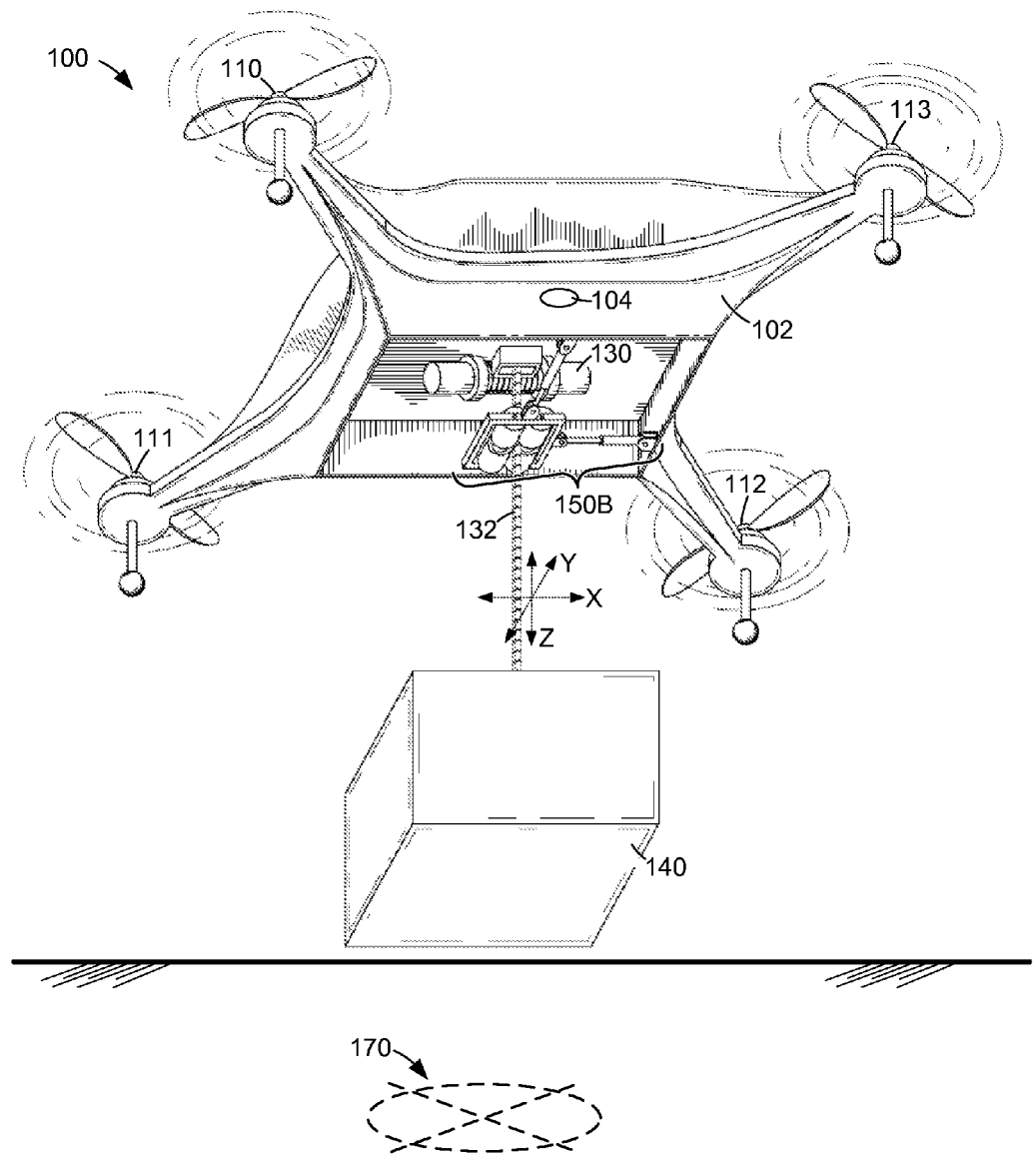
FIG. 1B illustrates a perspective view of the tether compensated UAV in FIG. 1A with an alternative tether compensation mechanism according another embodiment of the present disclosure.

FIG. 1B illustrates a perspective view of the tether compensated UAV 100 in FIG. 1A with an alternative tether compensation mechanism 150B according another embodiment of the present disclosure. As compared to the tether compensation mechanism 150A in FIG. 1A, the tether compensation mechanism 150B may be capable of grabbing, gripping, and compensating motions similar to the motions "A" and "B" in FIG. 1A, but using a different mechanical structure. The tether compensation mechanisms 150A in FIGS. 1A and 150B in FIG. 1B are described in detail below with reference to FIGS. 3A and 3B, respectively.

Figure 2:
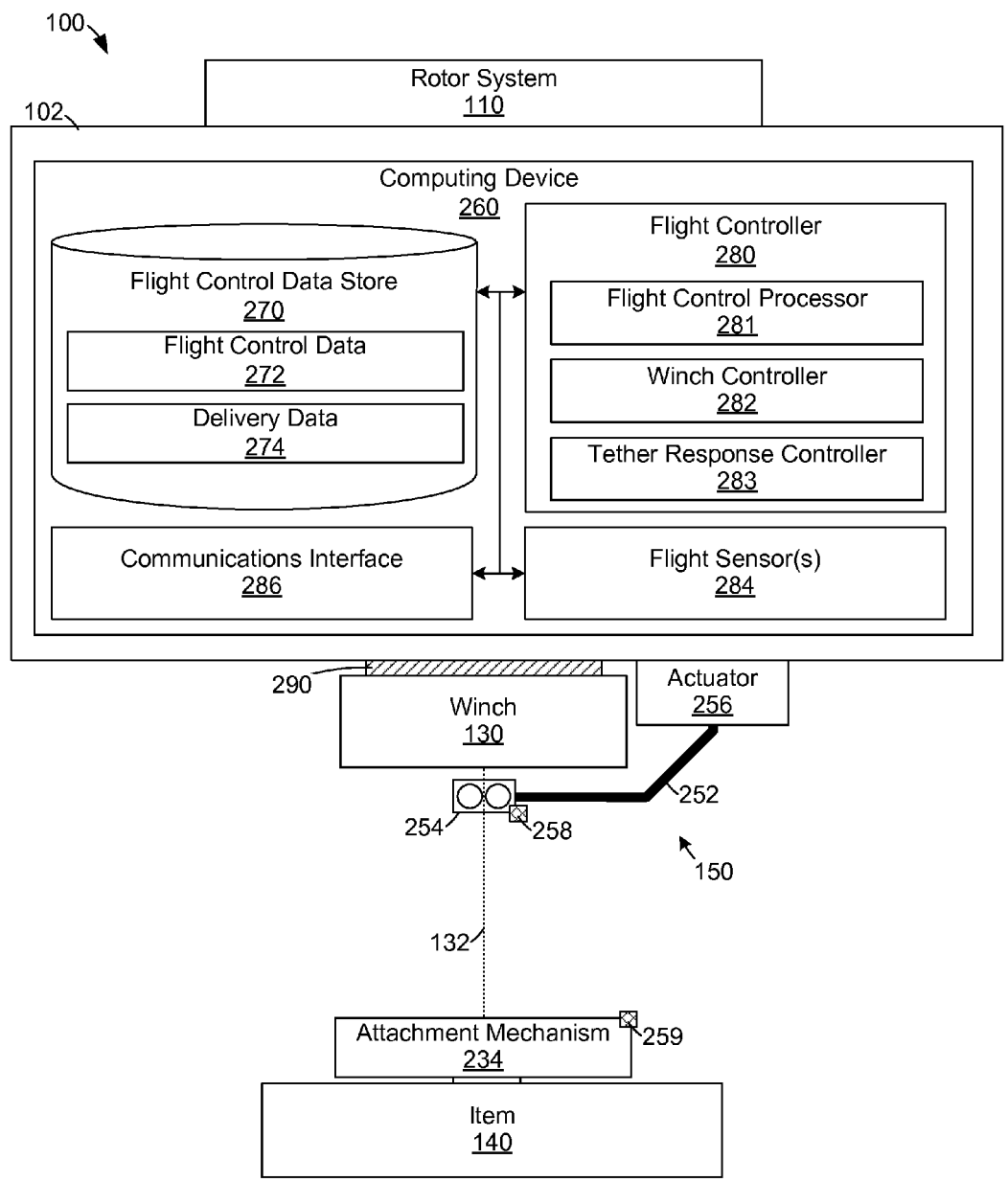
FIG. 2 illustrates a block diagram of components of the tether compensated UAV in FIGS. 1A and 1B according to various embodiments of the present disclosure.

Before turning to FIG. 2, it is noted that the UAV 100 in FIGS. 1A and 1B is provided as a representative example only, is not drawn to scale, and is not intended to be limiting with regard to the type, structure, or scope of the embodiments described herein. Similarly, in FIGS. 1A and 1B, the size, structure, and arrangement of the parts of the tether compensation mechanisms 150A and 150B are representative of embodiments of mechanisms to compensate for certain operating conditions which may arise due to use of the winch 130, and alternative embodiments are within the scope of the embodiments.

FIG. 2 illustrates a block diagram of components of the tether compensated UAV 100 in FIGS. 1A and 1B according to various embodiments of the present disclosure. The UAV 100 includes the frame 102, a rotor system 210, the winch 130 secured to an underside of the UAV 100, the tether 132 of the winch 130, an attachment mechanism 234 at one end of the tether 132, the tether compensation mechanism 150, a computing device 260, and a tension detector 290. The UAV 100 may be relied upon to deliver the item 140 as described herein.

As illustrated, the computing device 260 includes a flight control data store 270, a flight controller 280, one or more flight sensors 284, and a communications interface 286. The flight control data store 270 includes flight control data 272 and delivery data 274, and the flight controller 280 includes a flight control processor 281, a winch controller 282, and a tether response controller 283.

As with the illustrations in FIGS. 1A and 1B, the block diagram of the UAV 100 in FIG. 2 is not drawn to scale or to be limiting with regard to structural connections between components or relative structural arrangements between them. Instead, the block diagram provides a representative outline of various components that may be relied upon in tether compensated UAVs. Further, the block diagram of the UAV 100 in FIG. 2 is not exhaustive as to the components or parts of the UAV 100. That is, the UAV 100 may include other components, such as one or more batteries, fuel tanks, communications and/or control systems, etc., which are omitted for the sake of focus. Finally, not every component in FIG. 2 is required in all embodiments. In other words, one or more components illustrated in FIG. 2 may be omitted.

The rotor system 210 may include one or more motors, engines, etc., such as the motors 110-113 in FIGS. 1A and 1B, with attached propellers that provide thrust for flight of the UAV 100. Among embodiments, any suitable type and number of motors, engines, etc. may be relied upon to provide thrust for flight, depending upon considerations such as the size of the UAV 100, the weight of the item 140, the distance the UAV 100 must travel for delivery of the item 140, or other considerations. The rotor system 210 and, hence, the flight of the UAV 100 are controlled by the computing device 260 of the UAV 100, as described herein.

The winch 130 may be embodied as one or more winches similar to the winch 130 in FIGS. 1A and 1B, for example, or other types of winches. Generally, the winch 130 may be embodied as a mechanical device that extends and retracts the tether 132, the attachment mechanism 234 and, when attached, the item 140. In this context, the winch 130 may include a spool or drum for winding the tether 132 and gear assemblies powered by an electric motor, such as a stepper or continuous servo motor, for example, for turning or rotating the spool to extend or retract the tether 132. Among other means, the winch 130 may be secured to the frame 102 of the UAV 100 using any suitable attachment means, such as screws, bolts, clips, adhesives, or combinations thereof.

In various embodiments, the tether 132 may be embodied as one or more flexible, semi-flexible, or rigid string, rope, wire, chain, drag chain, extension spring, or other suitable types of tethers. The attachment mechanism 234 may be embodied as any suitable attachment mechanism or means at one end of the tether 132 for releasably securing the item 140 to the tether 132. For example, the attachment mechanism 234 may be embodied as a releasable clamp, grip, claw, or hook. In such case, the attachment mechanism 234 may be adjustable to secure various sizes of items, packages, parcels, etc. to the tether 132. As other examples, the attachment mechanism 234 may be embodied as one or more magnets, electromagnets, electro-permanent magnets, solenoid latches, etc.

If an electromagnet is relied upon as the attachment mechanism 234, the electromagnet may be powered or actuated to hold the item 140. When power to the electromagnet is cut off, the electromagnet may be demagnetized and release the item 140. If an electro-permanent magnet is relied upon, a permanent magnet may hold the item 140. When power is provided to the electro-permanent magnet, current that flows through the electro-permanent magnet may demagnetize, oppose, or overcome the magnetization of the permanent magnet and release the item 140. It should be appreciated that other attachment mechanisms are within the scope of the embodiments, including various combinations of the mechanisms described above. In the UAV 100, the winch controller 282 is configured to control the attachment mechanism 234 to secure and/or release the item 140 based on various considerations and/or control inputs as described below.

The tether compensation mechanism 150 illustrated in FIG. 2 includes at least one extension arm 252 including an actuator 256, an aperture mechanism 254 positioned proximate to an end of the extension arm 252, and a sensor 258 that identifies movement in the tether 132 based on contact between the tether 132 and the aperture mechanism 254 (e.g., due to movement in the tether 132). In some embodiments, the tether compensation mechanism 150 also includes a sensor 259 that identifies movement in the tether 132 based on movement in the attachment mechanism 234, which is also representative of movement in the item 140 at the end of the tether.

As shown in FIG. 2, the tether 132 extends or passes through the aperture mechanism 254, and the tether 132 may make mechanical or physical contact with the aperture mechanism 254. At least to some extent, contact between the tether 132 and the aperture mechanism 254 may be directed or controlled by the tether response controller 283 to compensate for or otherwise respond to movement in the tether 132. This compensation for or response to movement in the tether 132 may prevent, eliminate, or reduce undesirable movement, sway, or oscillations in the tether 132 and the item 140, for example, or otherwise help the UAV 100 to maintain a desired flight path or position.

Movement in the tether 132 may be identified (e.g., sensed) by the sensors 258 and 259 and, in some cases, by the tension detector 290, which is described in further detail below. In the embodiment illustrated in FIG. 2, the sensor 258 is mounted on the aperture mechanism 254, although it may be mounted at other locations on the UAV 100, such the frame 102. The sensor 259 is mounted on the attachment mechanism 234, although it may be mounted at other locations, such on the item 140. The sensors 258 and 259 may be embodied as one or more micro- or nano-electromechanical system (NEMS or MEMS) or other type of motion, accelerometer, gyroscope, or similar sensors. The sensors 258 and 259 may also include one or more contact or pressure sensors.

As noted above, because the tether 132 extends or passes through the aperture mechanism 254, if the tether 132 experiences motion that causes it to move, sway, or swing laterally against the aperture mechanism 254, the sensor 258 may identify a magnitude and direction of force or movement attributed to the sway or swing. In other words, the sensor 258 may be configured to identify at least one component (e.g., magnitude(s), direction(s), or magnitude(s) and direction(s)) of force or movement in the tether 132. Similarly, the sensor 259 may be configured to identify at least one component (e.g., magnitude(s), direction(s), or magnitude(s) and direction(s)) of movement in the attachment mechanism 234. In turn, the sensors 258 and 259 may provide control signals to the tether response controller 283 which are representative of the at least one component of the movement or force in the tether 132. In response, the tether response controller 283 is configured to determine a complementary response to the movement or force in the tether 132 and direct or control the tether compensation mechanism 150 as further described below. Similarly, if the tether 132 experiences motion that tends to cause the item 140 to move, sway, or swing laterally, the sensor 259 may identify a movement in the attachment mechanism 234 that is attributed to the movement.

The computing device 260 may be embodied, at least in part, as one or more embedded or general-purpose processors, computers, processing devices, or computing devices having memory. The computing device 260 may also be embodied, in part, as various functional and/or logic (e.g., computer-readable instruction, code, device, circuit, processing circuit, etc.) elements executed or operated to perform aspects of the embodiments described herein. The computing device 260 may be mounted and secured within the frame 102 of the UAV 100.

As noted above, the flight control data store 270 includes flight control data 272 and delivery data 274. The flight control data 272 may include any data necessary to control the flight of the UAV 100, such as operations and/or control algorithms, flight reference data, etc. The delivery data 274 may include any data necessary for the delivery of one or more items, such as map or coordinate system data, address data, scheduling and/or delivery protocol data, etc.

With regard to the flight controller 280, the flight control processor 281 is configured to control the flight and flight path of the UAV 100 for delivery of the item 140, for example, and to perform other tasks. The winch controller 282 is configured to control or actuate the winch 130 to extend and retract the tether 132 at certain times and based on certain considerations. The winch controller 282 is also configured to release the attachment mechanism 234 based on certain considerations described below.

The tether response controller 283 is configured to receive a control signal representative of at least one component of movement, force, or tension in the tether 132. Using the control signal as input, the tether response controller 283 is further configured to determine a complementary response to the movement, force, or tension and direct the tether compensation mechanism 150 based on the complementary response.

For example, after determining a complementary response to movement in the tether 132, the tether response controller 283 may direct the tether compensation mechanism 150 to brace against or compensate for the movement in an amount proportional to the complementary response. As one response, for example, the tether response controller 283 may direct the aperture mechanism 254 to grab, grip, pinch, or clamp the tether 132 to hold and prevent it from pulling further away from the winch 130. This type of response may be appropriate when an unexpected and relatively high amount of tension is experienced on the tether 132.

As another example response, the tether response controller 283 may direct the extension arm actuator 256 to actuate or move the extension arm 252 to counterbalance against or compensate for movement or sway detected in the tether 132. That is, the aperture mechanism 254 may be shifted to contact the tether 132 and stabilize the sway or movement in it. Such stabilization may prevent, eliminate, or reduce undesirable swinging, for example, in the tether 132. This type of response may be appropriate when the flight path of the UAV 100 changes or when wind causes the tether 132 to move or sway.

In various embodiments, the tether response controller 283 may operate in conjunction with or independently from the flight control processor 281 and/or the winch controller 282. For example, the tether response controller 283 may be configured to control the tether compensation mechanism 150 without communicating with the flight control processor 281 and/or the winch controller 282. Even in this situation, it should be appreciated that any undesirable movement that occurs in the tether 132 which is translated (i.e., passed on) to the UAV 100 may be detected by and compensated for by the flight sensors 284 and the flight control processor 281.

In other embodiments, the tether response controller 283 may be configured to control the tether compensation mechanism 150 based on or with reference to flight and winch control data from the flight control processor 281 and the winch controller 282. For example, the tether response controller 283 may determine a complementary response to movement in the tether 132 based on a current or expected flight path of the UAV 100. As another example, the tether response controller 283 may receive an indication of change in the flight path of the UAV 100 from the flight control processor 281, before the change occurs. The tether response controller 283 may then determine a complementary response to the change in the flight path and direct the tether compensation mechanism 150 accordingly. This feed-forward control of the tether compensation mechanism 150 (i.e., before flight path changes of the UAV 100 occur) may help to avoid undesirable or unexpected swinging in the tether 132. Alternatively, rather than (or in addition to) directing the tether compensation mechanism 150, the tether response controller 283 may direct the flight control processor 281 to make adjustments in the flight path of the UAV 100 to avoid movement or swing conditions in the tether 132.

As still another example, the tether response controller 283 may receive an indication as to whether the winch 130 is extending or retracting the tether 132. In that case, the tether response controller 283 may determine a complementary response based at least in part on whether the tether 132 is extending from or retracting to the winch 130 and/or the length of extension of the tether 132 from the winch 130.

The flight sensors 284 may include one or more NEMS, MEMS, or other types of motion, accelerometer, gyroscope, or similar sensors. The flight sensors 284 may also include one or more global positioning system ("GPS") sensors, height, altitude, or altimeter sensors, an ultrasonic sensor, a pressure sensor, and/or image, infrared, or thermal sensors (i.e., various types of cameras) (e.g., the camera 104 in FIGS. 1A and 1B), among others. The flight sensors 284 may provide geographic, navigation, and/or orientation signals to the flight controller 280. In certain embodiments, one or both of the sensors 258 and 259 may be omitted and the sensing functions of the sensors 258 and 259 may be performed by the flight sensors 284.

The communications interface 286 may include any suitable interface for communicating data, such as a cellular interface (e.g., Global System for Mobile communications ("GSM"), Code Division Multiple Access ("CDMA"), Local Multi-point Distribution Systems ("LMDS"), Long Term Evolution ("LTE"), Multi-channel-Multi-point Distribution System ("MMDS"), etc.), a Bluetooth interface, a Wireless Local Area Network ("WLAN") (e.g., 802.11-based) interface, or any combination thereof, among other communications interfaces.

As illustrated in FIG. 2, the tension detector 290 may be interposed between the winch 130 and the frame 102 of the UAV 100. The tension detector 290 may be embodied as a sensor that detects an amount of vertical tension, weight, or load on the tether 132. The tension detector 290 may also provide a control signal representative of that amount of tension to the computing device 260.

In some embodiments, the tension detector 290 may break or disconnect automatically under a predetermined amount of tension. In that context, the tension detector 290 may be embodied as one or more attachment structures (e.g., screws, buts, bolts, clips, etc.) of limited tensile strength. In such case, if an unexpected level of tension arises in the tether 132, the tension detector 290 may automatically break or disconnect the winch 130 from the frame 102.

In other embodiments, the tension detector 290 may break or disconnect in response to a control signal from the computing device 260. That is, the tension detector 290 may be controlled by the computing device 260 to release or disconnect the winch 130 from the frame 102 based on an amount of tension detected by tension detector 290. In this case, the tension detector 290 may be embodied as some type of exploding, fracturing, or pyrotechnic attachment structure that releases in response to a control signal from the computing device 260. Thus, if an unexpected level of tension (e.g., greater than a predetermined amount) arises, the tension detector 290 may detect and provide a control signal representative of that tension to the computing device 260. In turn, the computing device 260 may control the tension detector 290 (and/or the attachment mechanism 234) to disconnect. In this sense, the tension detector 290 offers some protection against the tether 132 being unexpectedly pulled or caught in a tree, power line, etc.

Figure 3A:
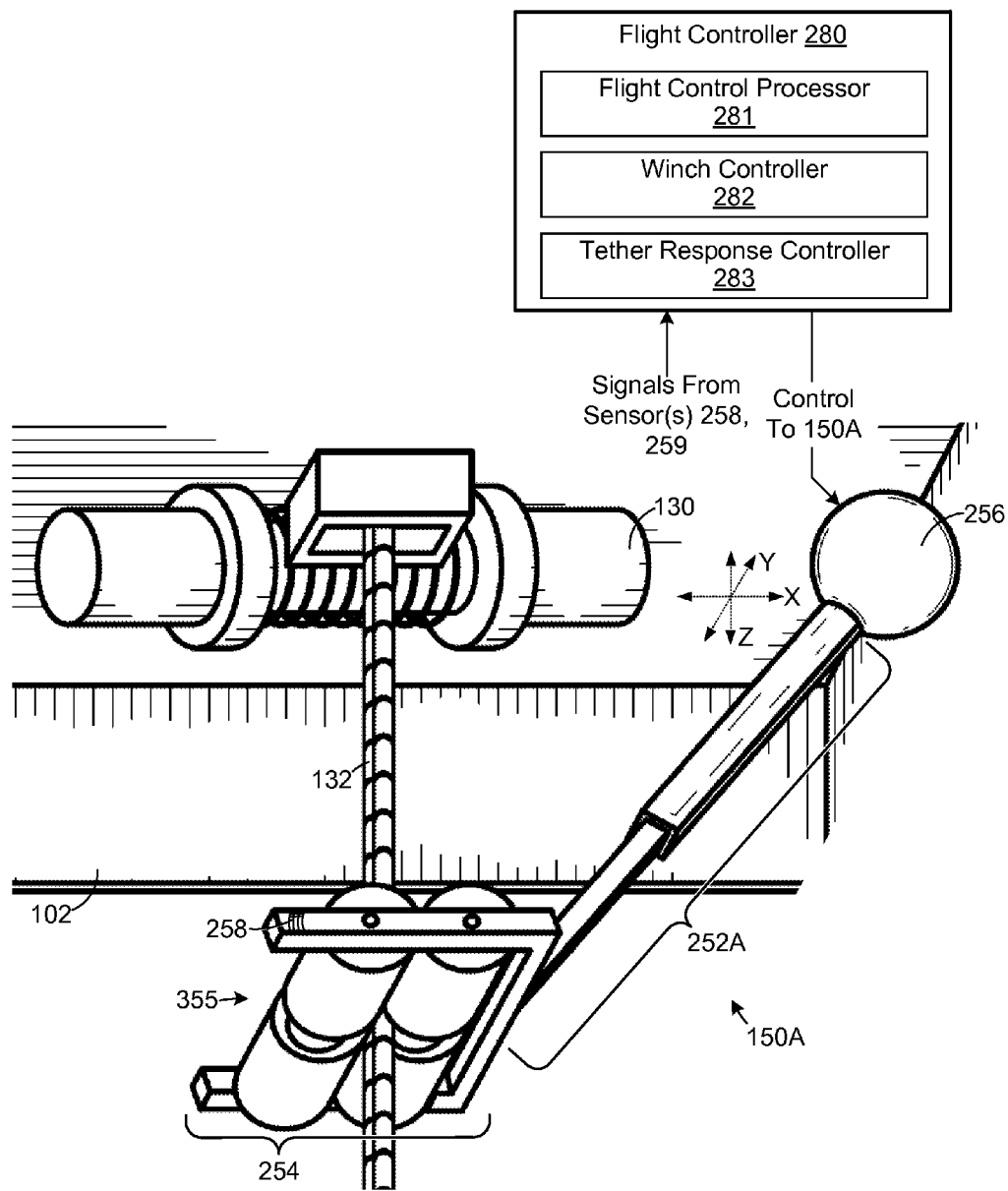
FIG. 3A illustrates a tether compensation mechanism of the UAV in FIG. 1A according to one embodiment of the present disclosure.

FIG. 3A illustrates the tether compensation mechanism 150A of the UAV 100 in FIG. 1A. The tether compensation mechanism 150A includes the extension arm 252A, the aperture mechanism 254, and the extension arm actuator 256. The extension arm actuator 256 is mounted between one end of the extension arm 252A and the frame 102, and the aperture mechanism 254 is mounted proximate to another end of the extension arm 252A. The tether compensation mechanism 150A also includes the sensor 258 that identifies movement in the tether 132 based on physical contact between the tether 132 and the aperture mechanism 254, and the sensor 259 that identifies movement in the tether 132 based on movement in the attachment mechanism 234 (FIG. 2).

As shown in FIG. 3A, the tether compensation mechanism 150A is designed to provide at least some movement in one or more of the "X," "Y," and "Z" directions based on control signals from the tether response controller 283. To that end, the extension arm 252A may be embodied as an adjustable-length telescoping arm, and the extension arm actuator 256 may be embodied as various electromechanical systems (e.g., motors, servos, solenoids, etc.) capable of moving the extension arm 252A. The tether response controller 283 may direct the extension arm actuator 256 and the extension arm 252A to move the attachment mechanism 234, make contact with the tether 132, and counterbalance against or compensate for movement or sway detected in the tether 132. In one embodiment, the aperture mechanism 254 may include rollers 355 that surround or encircle the tether 132, although it is not necessary that the aperture mechanism 254 completely encircle the tether 132 in every embodiment. The rollers 355 include a clearance through which the tether 132 extends. The rollers 355 may be controlled by the tether response controller 283 to press together. In that case, the rollers 355 may grab, grip, pinch, or clamp the tether 132 to hold and prevent it from pulling further away from the winch 130 and the UAV 100.

Figure 3B:
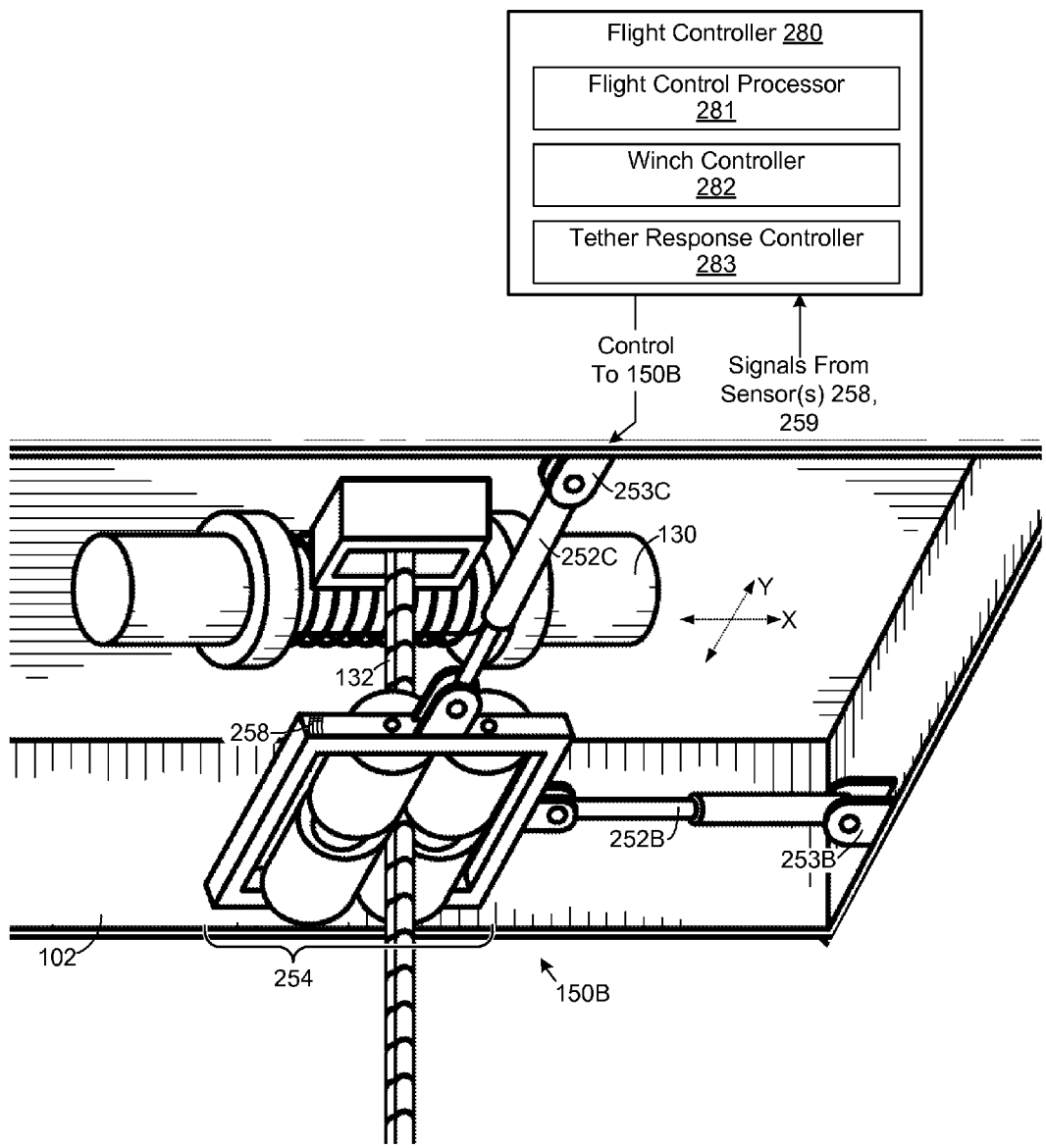
FIG. 3B illustrates a tether compensation mechanism of the UAV in FIG. 1B according to another embodiment of the present disclosure.

FIG. 3B illustrates the tether compensation mechanism 150B of the UAV 100 in FIG. 1B according to another embodiment of the present disclosure. The tether compensation mechanism 150B includes the extension arms 252B and 252C and the aperture mechanism 254. The aperture mechanism 254 is mounted proximate to ends of the extension arms 252B and 252C, and the other ends of the extension arms 252B and 252C are mounted to the frame 102. The tether compensation mechanism 150B also includes the sensor 258 that identifies movement in the tether 132 based on physical contact between the tether 132 and the aperture mechanism 254, and the sensor 259 that identifies movement in the tether 132 based on movement in the attachment mechanism 234 (FIG. 2).

As shown in FIG. 3B, the tether compensation mechanism 150B is designed to provide at least some movement in at least the "X" and "Y" directions based on control signals from the tether response controller 283. To that end, the extension arms 252B and 252C may be embodied as an adjustable-length telescoping arms and electromechanical systems (e.g., motors, servos, solenoids, etc.) capable of adjusting the angles of the extension arms 252B and 252C at the pivots points 253B and 253C. The tether response controller 283 may direct the extension arms 252B and 252C and the pivots points 253B and 253C to move the aperture mechanism 254, make contact with the tether 132, and counterbalance against or compensate for movement or sway detected in the tether 132.

Figure 4:
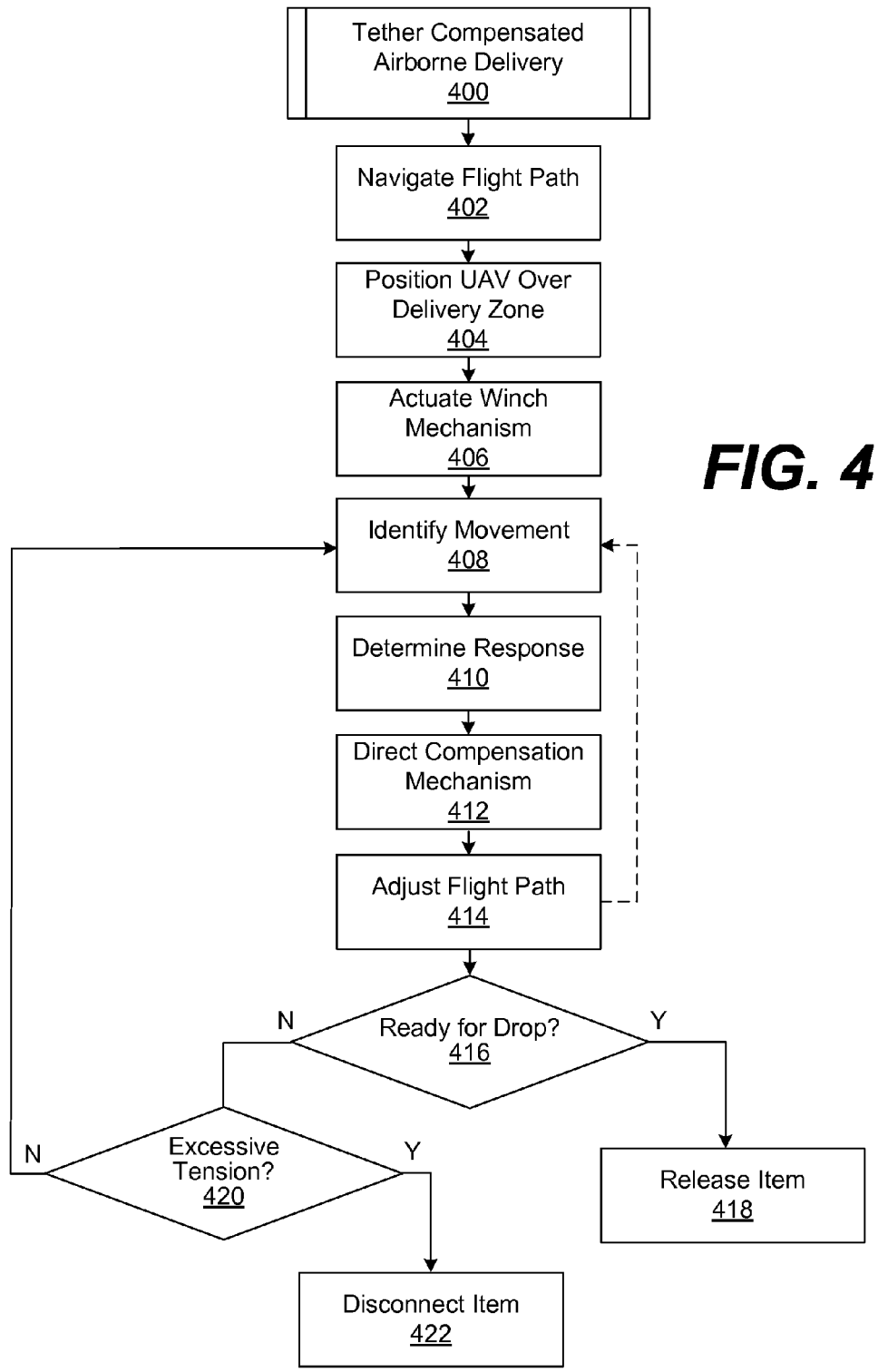
FIG. 4 illustrates a flow diagram of an example process of tether compensated airborne delivery.

For additional details regarding the operation of the UAV 100 in FIGS. 1, 2, 3A, and 3B, FIG. 4 illustrates a flow diagram of an example process 400 of tether compensated airborne delivery that may be performed by the UAV 100. While the process 400 is described in connection with the UAV 100, it should be appreciated that the process 400 may be performed by other UAVs. It should also be noted that the flowchart in FIG. 4 provides merely one example of a process that may be employed for tether compensated airborne delivery.

At reference numeral 402, the process 400 includes navigating a flight path of the UAV 100 to deliver the item 140 (FIG. 2). Here, it is assumed that the UAV 100 has picked up the item 140 for delivery, and that the item 140 is secured to the tether 132 by way of the attachment mechanism 234. The flight controller 280 is configured to reference any data necessary in the flight control data 272 and/or the delivery data 274 for navigation and control of the rotor system 210 to direct the UAV 100 to a predetermined delivery zone for the item 140. The predetermined delivery zone may be identified by an address, street location, geographic coordinates, or other identifying information. While navigating, the flight control processor 281 may reference data provided by the flight sensors 284, such as GPS coordinates, image information, etc., to locate the delivery zone.

When the UAV 100 is proximate to the delivery zone, the process 400 includes positioning the UAV 100 over the delivery zone to deliver the item 140, at reference numeral 404. The delivery zone may be marked with some visual marking, as the delivery zone 170 in FIGS. 1A and 1B is marked with crosshairs, for example. When visually marked, the UAV 100 may rely upon an image sensor among the flight sensors 284, for example, to narrow in on the delivery zone at reference numeral 404 (e.g., using image processing).

Once the UAV 100 is positioned over the delivery zone, at reference numeral 406, the process 400 includes actuating the winch 130 to lower the tether 132. More particularly, the winch controller 282 may actuate the winch 130 to extend the tether 132 down and lower the item 140 for delivery. The use of the winch 130 to lower the item 140 from the UAV 100 may raise the potential for flight instability for the UAV 100, the potential for undesirable sway or oscillations in the tether 132 and the item 140, the potential for unexpected forces on the tether 132, etc.

Thus, at reference numeral 408, the process 400 includes identifying, by one or more of the sensors 258 and 259, for example, at least one component of movement or force in the tether 132. As discussed above, the sensor 258 may identify or measure lateral movement or forces in the tether 132 based on physical contact between the tether 132 and the aperture mechanism 254. Further, the sensor 259 may identify movement in the tether 132 due to movement in the attachment mechanism 234. In turn, the sensors 258 and 259 may provide one or more control signals that are representative of the movement or force in the tether 132 to the tether response controller 283.

In some embodiments, at reference numeral 408, the process 400 may also include identifying tension in the tether 132 using by the tension detector 290. The tension detector 290 may identify vertical force or tension (i.e., weight, load, etc.) in the tether 132 and provide a signal representative of such tension to the tether response controller 283. As described in further detail below, the tether response controller 283 may monitor for vertical tension greater than a predetermined threshold or greater than that expected for the weight of the item 140, for example.

At reference numeral 410, the process 400 includes the tether response controller 283 determining a response to the movement or force identified at reference numeral 408. In this context, the tether response controller 283 may determine that it is necessary to grab, grip, pinch, or clamp the tether 132 to prevent it from pulling further away from the winch 130. This type of response may be appropriate when an unexpected and relatively high amount of vertical or lateral movement is experienced on the tether 132. As another example, the tether response controller 283 may determine a complementary, proportional response to vertical or lateral components of movement or force identified at reference numeral 408. This type of response may be appropriate when the flight path of the UAV 100 changes or when wind causes the tether 132 to sway.

At reference numeral 412, the process 400 includes the tether response controller 283 directing the tether compensation mechanism 150 to brace the tether 132 against the movement in the tether 132 according to the response determined at reference numeral 410. In this context, the tether response controller 283 may direct the aperture mechanism 254 to grab the tether 132 or direct the extension arm actuator 256 to counterbalance against movement or sway detected in the tether 132. In that way, the aperture mechanism 254 may be shifted to contact the tether 132 and stabilize the movement or sway in it. Such stabilization may prevent, eliminate, or reduce undesirable swinging, for example, in the tether 132. This type of response may be appropriate when the flight path of the UAV 100 changes or when wind causes the tether 132 to sway.

At reference numeral 414, the process 400 may include the flight control processor 281 adjusting or stabilizing the fight path of the UAV 100. That is, during and after the winch controller 282 lowers the tether 132, the flight control processor 281 is configured to direct the flight and/or maintain an orientation of the UAV 100. In this context, the flight control processor 281 may receive feedback from both the flight sensors 238 and the tether response controller 283 when adjusting or stabilizing the fight path of the UAV 100. Thus, the flight control processor 281 may make adjustments, in part, based on the complementary response to the movement determined at reference numeral 410. Further, the flight control processor 281 may provide an indication of change in the flight path of the UAV 100 to the tether response controller 283, as feed forward information. The tether response controller 283 may use this information to determine the appropriate response to control the tether compensation mechanism 150.

At reference numeral 416, the process 400 includes determining whether the UAV 100 is ready to drop the item 140. Here, the winch controller 282 may consider various factors before directing the attachment mechanism 234 to release the item 140. For example, the winch controller 282 may consider whether the orientation of the UAV 100 is stable enough and/or whether any movement in the tether 132 is small enough to release the item 140 at reference numeral 416. Also, the winch controller 282 may determine whether the height of the UAV 100 is suitable for releasing the item 140. In some cases, the winch controller 282 may determine whether the height of the UAV 100 is less than a predetermined height before releasing the item 140. If the height of the UAV 100 is too great, the winch controller 282 may determine that the UAV 100 is not low enough to safely release the item 140, and the process 400 may proceed to reference numeral 420.

At reference numeral 420, the process 400 includes determining whether the tension in the tether 132 is too high for safe operation of the UAV 100. In other words, at reference numeral 420, the process 400 includes determining whether the tension is greater than a predetermined threshold or greater than that expected for the weight of the item 140, for example. For example, the tension detector 290 may detect the tension and provide a signal representative of it to the tether response controller 283. The tether response controller 283 may determine whether the tension is greater than a predetermined threshold. If so, the process 400 proceeds to reference numeral 422, for disconnecting the item 140 from the UAV 100. Particularly, the tether response controller 283 may control the tension detector 290 to disconnect the winch 130 from the UAV 100. If disconnected, the winch 130 may fall from the UAV 100 along with the item 140. In this sense, the tension detector 290 offers some protection against the tether 132 or the item 140 being unexpectedly pulled or caught in a tree, power line, etc.

Figure 5:
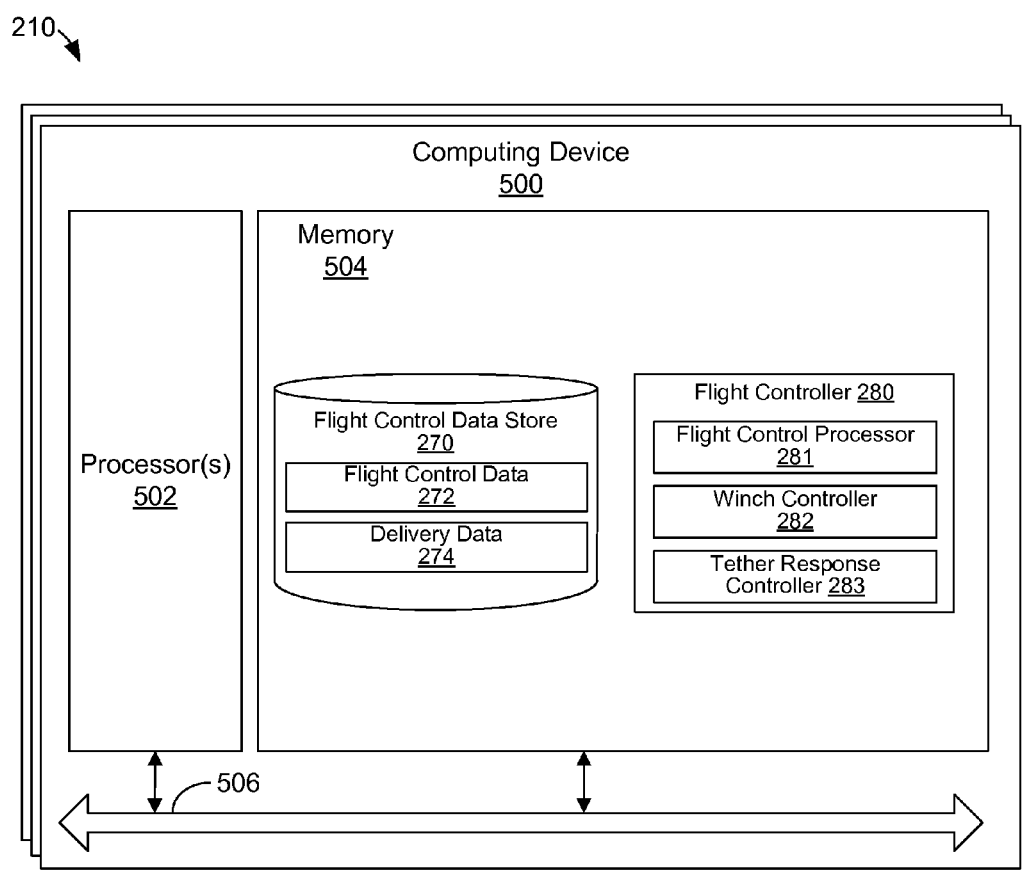
FIG. 5 illustrates an example schematic block diagram of the computing device employed in the tether compensated UAV in FIG. 2 according to various embodiments of the present disclosure.

FIG. 5 illustrates an example schematic block diagram of the computing device 260 employed in the tether compensated UAV 100 in FIGS. 1-3 according to various embodiments of the present disclosure. The computing device 260 includes one or more computing devices 500. Each computing device 500 includes at least one processing circuit or system, for example, having a processor 502 and a memory 504, both of which are electrically and communicatively coupled to a local interface 506. The local interface 506 may be embodied as, for example, a data bus with an accompanying address/control bus or other bus structure as can be appreciated.

In various embodiments, the memory 504 stores data and software or executable-code components executable by the processor 502. For example, the memory 504 may store executable-code components associated with the flight controller 280, for execution by the processor 502. The memory 504 may also store data such as that stored in the flight control data store 270, among other data.

The memory 504 may store other executable-code components for execution by the processor 502. For example, an operating system may be stored in the memory 504 for execution by the processor 502. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 504 stores software for execution by the processor 502. In this respect, the terms "executable" or "for execution" refer to software forms that can ultimately be run or executed by the processor 502, whether in source, object, machine, or other form. Examples of executable programs include, for example, a compiled program that can be translated into a machine code format and loaded into a random access portion of the memory 504 and executed by the processor 502, source code that can be expressed in an object code format and loaded into a random access portion of the memory 504 and executed by the processor 502, source code that can be interpreted by another executable program to generate instructions in a random access portion of the memory 504 and executed by the processor 502, etc. An executable program may be stored in any portion or component of the memory 504 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 504 may include both volatile and nonvolatile memory and data storage components. Volatile components are those that do not retain data values upon loss of power. Nonvolatile components are those that retain data upon a loss of power. Thus, the memory 504 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 502 may represent multiple processors 502 and/or multiple processor cores and the memory 504 may represent multiple memories that operate in parallel, respectively, or in combination. Thus, the local interface 506 may be an appropriate network or bus that facilitates communication between any two of the multiple processors 502, between any processor 502 and any of the memories 504, or between any two of the memories 504, etc.

As discussed above, the flight controller 280 may be embodied, in part, by software or executable-code components for execution by general purpose hardware. Alternatively, the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagram of FIG. 4 is representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 502. The machine code may be converted from the source code, etc. Further, each block may represent, or be connected with, a circuit or a number of interconnected circuits to implement a certain logical function or process step.

Although the flowchart or process diagram of FIG. 4 illustrates a specific order, it is understood that the order may differ from that which is depicted. For example, an order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application component described herein, such as the flight controller 280 that is embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 4. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. An Unmanned Aerial Vehicle (UAV), comprising:
a winch secured to the UAV, the winch including a tether to lower an item from the UAV for delivery;
an attachment mechanism to releasably secure the item to the tether;
a flight controller configured to control a flight path of the UAV and extension of the tether from the winch;
a tether compensation mechanism secured to the UAV;
a sensor configured to identify at least one component of movement in the tether when the tether is extended from the winch; and
a tether response controller configured to:
determine a complementary response to the movement in the tether; and
direct the tether compensation mechanism to contact and counterbalance the tether against the movement in the tether according to the complementary response, wherein
the flight controller is further configured to adjust the flight path of the UAV based on the complementary response.

2. The UAV according to claim 1, wherein the tether compensation mechanism comprises:
at least one extension arm actuator mounted to the UAV at one end; and
an aperture mechanism positioned proximate to another end of the at least one extension arm actuator to contact the tether, the tether passing through the aperture mechanism.

3. The UAV according to claim 1, wherein the tether response controller is further configured to:
receive an indication of change in the flight path of the UAV; and
determine the complementary response based further on the indication of change in the flight path of the UAV.

4. A method to compensate for tether movement in an Unmanned Aerial Vehicle (UAV), comprising:
controlling, by at least one computing device of the UAV, a flight path of the UAV;
controlling, by the at least one computing device of the UAV, extension of a tether from a winch secured to the UAV for delivery of an item;
identifying, by at least one sensor, at least one component of movement in the tether;
determining, by the at least one computing device of the UAV, a complementary response to the movement in the tether;
directing, by the at least one computing device of the UAV, a tether compensation mechanism to contact and counterbalance the tether against the movement according to the complementary response; and
adjusting, by the at least one computing device, the flight path of the UAV based on the complementary response.

5. The method according to claim 4, wherein the tether compensation mechanism comprises:
at least one extension arm actuator mounted to the UAV at one end; and
an aperture mechanism positioned proximate to another end of the extension arm actuator, the tether passing through the aperture mechanism.

6. The method according to claim 5, further comprising directing the aperture mechanism to clamp the tether based at least in part on the flight path of the UAV.

7. The method according to claim 4, further comprising determining the complementary response based at least in part on the flight path of the UAV.

8. The method according to claim 4, further comprising:
receiving, by the at least one computing device of the UAV, an indication of change in the flight path of the UAV; and
determining, by the at least one computing device of the UAV, the complementary response based further on the indication of change in the flight path of the UAV.

9. The method according to claim 4, further comprising determining, by the at least one computing device of the UAV, the complementary response based upon whether the tether is extending or retracting from the winch and a length of extension of the tether from the winch.

10. The method according to claim 4, wherein adjusting the flight path of the UAV comprises adjusting, by the at least one computing device, the flight path based further on the movement in the tether.

11. The method according to claim 4, further comprising actuating, by the at least one computing device of the UAV, an attachment mechanism to release the item based on a magnitude of tension in the tether.

12. An Unmanned Aerial Vehicle (UAV), comprising:
a winch secured to the UAV, the winch including a tether to lower an item from the UAV for delivery;
a flight controller configured to control flight of the UAV and extension of the tether from the winch;

a sensor configured to identify at least one component of movement in the tether; and a tether response controller configured to:
   determine a complementary response to the movement in the tether; and
   direct a tether compensation mechanism to contact and counterbalance the tether against the movement according to the complementary response, wherein
the flight controller is further configured to adjust the flight of the UAV based on the complementary response.

13. The UAV according to claim 12, wherein the movement comprises at least one of lateral movement and vertical tension components.

14. The UAV according to claim 12, wherein the tether compensation mechanism comprises:
   at least an extension arm actuator mounted to the UAV at one end; and
   an aperture mechanism positioned proximate to another end of the extension arm actuator, the tether passing through the aperture mechanism.

15. The UAV according to claim 14, wherein the tether response controller is further configured to direct the aperture mechanism to clamp the tether based at least in part on a flight path of the UAV.

16. The UAV according to claim 12, wherein the tether response controller is further configured to determine the complementary response based at least in part on the flight of the UAV.

17. The UAV according to claim 12, wherein the tether response controller is further configured to:
   receive an indication of change in a flight path of the UAV; and
   determine the complementary response based further on the indication of change in the flight path of the UAV.

18. The UAV according to claim 12, wherein the tether response controller is further configured to determine the complementary response based upon whether the flight controller is extending or retracting the tether from the winch and a length of extension of the tether from the winch.

19. The UAV according to claim 12, wherein the flight controller is further configured to adjust the flight of the UAV based further on the movement in the tether.

20. The UAV according to claim 12, further comprising an attachment mechanism to releasably secure the item to the tether, wherein the flight controller is further configured to actuate the attachment mechanism to release the item based on a magnitude of tension in the tether.

* * * * *